United States Patent [19]  [11] 4,125,843
Whitby  [45] Nov. 14, 1978

[54] METHOD AND APPARATUS FOR RECORDING AND PROJECTING IMAGES

[75] Inventor: Clyde M. Whitby, Valencia, Calif.

[73] Assignee: The Singer Company, New York, N.Y.

[21] Appl. No.: 842,142

[22] Filed: Oct. 14, 1977

[51] Int. Cl.² .......................... G01D 9/32; G01D 7/02
[52] U.S. Cl. .................................... 346/17; 346/76 L; 350/152; 350/157; 350/173; 353/20
[58] Field of Search ........................... 346/17, 76 L, 1; 350/152, 157, 173; 353/20, 121

[56] References Cited

U.S. PATENT DOCUMENTS

| 3,753,608 | 8/1973 | Bernal, Jr. ....................... 350/157 X |
| 3,961,334 | 6/1976 | Whitby .................................... 346/17 |

Primary Examiner—Joseph W. Hartary
Attorney, Agent, or Firm—Charles R. Lewis

[57] ABSTRACT

A single projector and a laser radiation deflecting means enable laser generated images to be projected onto a screen together with a laser pointer. A first laser beam polarized in a first plane and a second laser beam polarized in a second plane is projected into a polarizer cube wherein the first laser beam is reflected to a record medium to record images thereon and the second laser beam is transmitted through the polarizer cube. Polarization and deflecting means located in the path of the transmitted second laser beam changes the polarization of the second laser beam to the polarization of the first laser beam and reflects the second laser beam back into the polarizer cube wherein the second laser beam is reflected in a direction opposite to that of the first laser beam to enable the second laser beam to function as a pointer. By backlighting the record medium with illumination radiation polarized in the second plane, the images recorded on the record medium can be projected onto a screen together with the laser pointer. Illumination radiation polarized in the second plane is obtained from unpolarized illumination by focusing the unpolarized illumination radiation into a polarizer cube to convert the single beam of unpolarized radiation into a first beam of radiation polarized in the second plane and a second beam of radiation polarized in the first plane. By changing the polarization of the second beam of radiation to polarization in the second plane, both the first and second beams of polarized, illumination radiation can be utilized to backlight the record medium to project the image(s) recorded therein.

11 Claims, 3 Drawing Figures

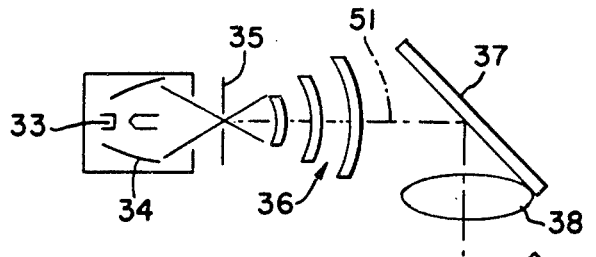
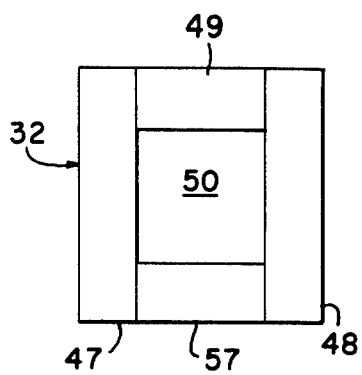
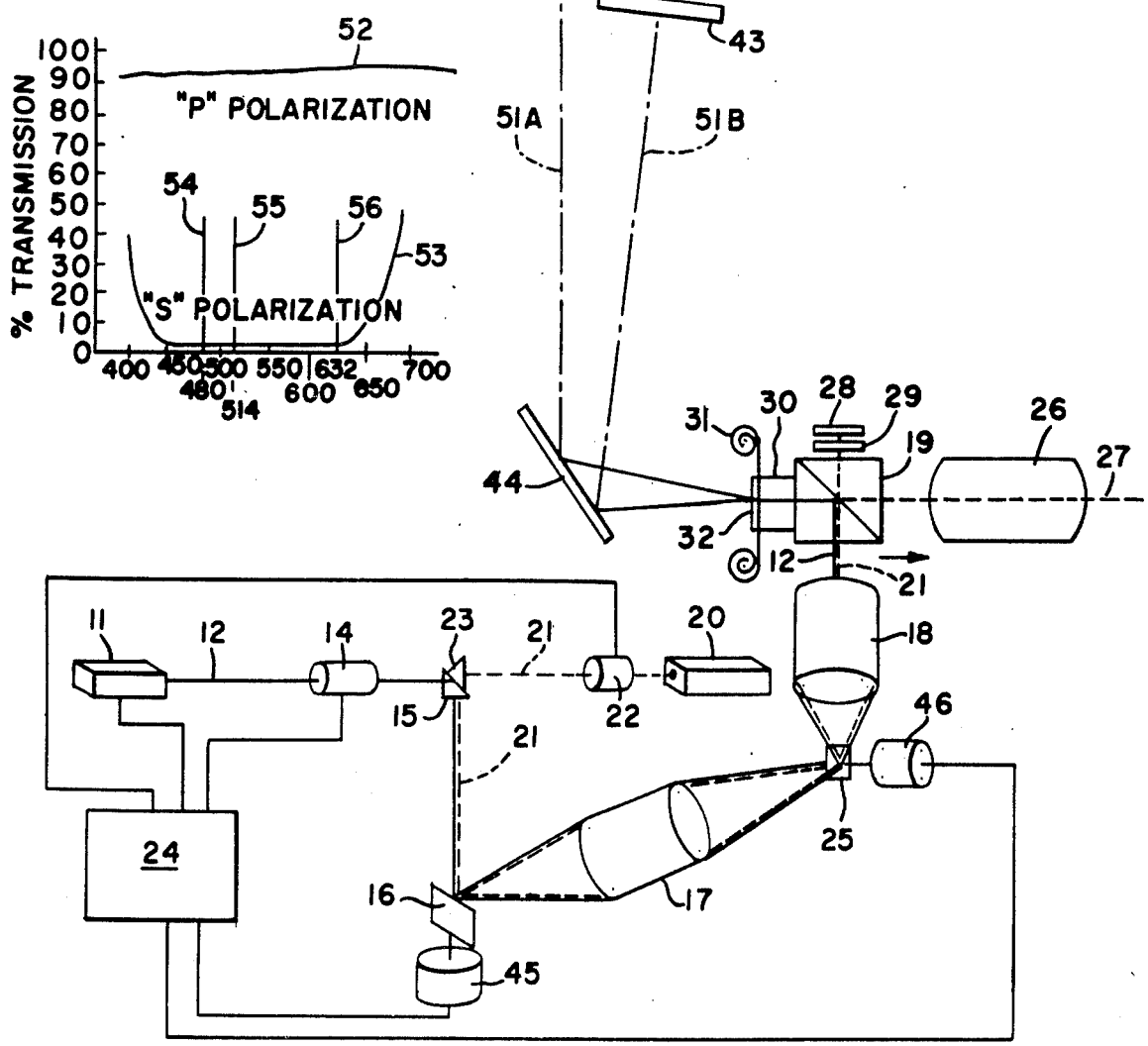

METHOD AND APPARATUS FOR RECORDING AND PROJECTING IMAGES

BACKGROUND OF THE INVENTION

I. Field of the Invention

This invention relates to display systems wherein a laser generated image is projected for display. More particularly, this invention relates to laser recording and projection display systems wherein the use of achromatic polarizing cubes together with a single projector and a single laser deflecting and focusing system enables a first laser beam to be used to generate the images that are to be projected and a second laser beam to be used as a pointer with the projected image.

II. Description of the Prior Art

A laser recording and projection system is disclosed in U.S. Pat. No. 3,961,334 wherein a selectively deflected laser beam is utilized to generate an image on a metallized film. By backlighting the metallized film, the images recorded thereon can be projected upon a display screen. Such display systems are useful as online systems for the display of alphanumeric data, charts, map plotting, military training programs, and the like. As will be apparent, there are circumstances which make it desirable to be able to selectively scan a pointer over the projected image as an aid to the viewer. Preferably, such a pointer is projected along the same projection axis as the projected image. It is also desirable that the pointer have the capability of being automatically controlled. For reasons of economy and reliability, the pointer should use as much as possible of the existing projection system and incorporation of such a pointer into the system should not decrease the image brightness.

Accordingly, one object of this invention is to provide an improved laser recording and projection system.

Another object of this invention is to provide an improved laser recording and projection system having a pointer that is selectively controlled over the projected image.

A further object of this invention is to provide a display system wherein information is plotted and projected with a high efficiency light source.

Still another object of this invention is to provide a display system which enables the simultaneous plotting and projection of laser recorded information together with a laser pointer.

An additional object of this invention is to provide a laser recording and projection system wherein a nonpolarized light source is split into two polarizations with one polarization then being rotated to correspond to the other polarization to obtain only one polarization of projection radiation that is compatible with a polarized projector.

BRIEF DESCRIPTION OF THE INVENTION

Briefly described, these and other objects, features and advantage of the present invention are obtained in a recording and projection system that includes a projection lens having a projection axis. An image recording medium is located at the object plane of the projection lens and is positioned substantially perpendicular to the projection axis. The recording medium normally has an opaque state that is changed into a transparent state where exposed to focused laser radiation. A polarizer cube is located between the recording medium and the projection lens and is located along the projection axis for reflecting light that is polarized in a first plane and transmitting light that is polarized in a second plane. A first laser provides radiation polarized in the first plane while a second laser provides radiation polarized in the second plane. Deflecting and focusing means direct the first and second laser beams into the polarizer cube in a direction substantially perpendicular to the projection axis. The laser beam polarized in the first plane is deflected by the polarizer cube to the recording medium to record an image thereon while the second laser beam polarized in the second plane passes through the polarizer cube. However, polarizing and reflecting means interposed in the path of the laser radiation polarized in the second plane and transmitted through the polarizer cube causes the transmitted laser radiation to be polarized in the first plane and reflected back into the polarizer cube wherein it is reflected by the polarizer cube along the projection axis in a direction opposite to the laser radiation utilized for image forming. A source of illumination polarized in the second plane and located behind the recording medium allows the images recorded thereon to be projected onto a screen together with the laser radiation reflected back into the polarizer cube which functions as a pointer. Since the polarizer cube can only pass radiation polarized in the second plane, an efficient source of illumination radiation is obtained by focusing and directing unpolarized illumination radiation into a polarizer cube which produces a first beam of illumination radiation polarized in the second plane and a second beam of illumination radiation polarized in the first plane. Polarization means interposed in the path of the second beam of illumination radiation causes it to be polarized in the second plane. Reflecting means direct both the first and second beam of illumination, now both polarized in the second plane, through the record medium for projecting the image recorded thereon along the projection axis onto a screen.

BRIEF DESCRIPTION OF THE DRAWINGS

The present invention will be clearly understood from the detailed description which follows taken in conjunction with the following drawings wherein like reference characters designate like or corresponding parts throughout the several views and wherein:

FIG. 1 is a simplified drawing of a schematic illustration of the optical components and principles of the invention;

FIG. 2 is a chart that illustrates typical light transmission characteristics of an achromatic polarizing cube that is utilized in the present invention; and FIG. 3 illustrates one arrangement of color filters that may be utilized with the present invention to project multi-color images.

DESCRIPTION OF THE PREFERRED EMBODIMENT

Referring now to FIG. 1, the apparatus of the present invention is shown as including a pulsed argon laser 11 which provide green laser radiation 12 having wavelengths of about 488 and 515 nano meters. The laser radiation 12, under control of circuitry 24, is selectively blanked or otherwise prevented from entering a channel selector 14. Under control of the circuitry 24, the channel selector 14 will rotate the polarization of the laser beam 12 0° or 90° with respect to the polarization characteristics of the polarizing cube 19 to polarize the laser beam 12 in either the "P" or "S" plane respectively. In accordance with the present invention, the channel selector 14 causes the laser beam 12 to be polarized in the "S" plane. The "S" polarized laser beam 12 is reflected by the prism 15 to fall upon a mirror 16 of a X-deflection glavanometer 45 which is also under the control of the circuitry 24 to selectively deflect the laser beam 12 along the horizontal direction as it enters a relay lens 17. Upon leaving the relay lens 17 the "S" polarized laser beam 12 falls upon a mirror 25 of a Y-deflection galvanometer 46 which is also under the control of the circuitry 24 to selectively deflect the beam 12 along the vertical direction as it enters a focus lens 18. The focusing lens 18 directs the polarized laser beam 12 to an achromatic polarizing cube 19.

A continuous wave helium-neon laser 20 provides red laser radiation 21 having a wavelength of about 632.8 nanometers. By rotating the laser 20 the laser radiation 21 is caused to be polarized in the "P" plane with respect to the polarization of the polarizing cube 19. The laser radiation 21 is directed through a shutter 22 which is controlled by the circuitry 24. The shutter 22 may comprise a plate (not shown) which is caused to interrupt the laser beam 21 under the control of the circuitry 24, or any other suitable shuttering means. The "P" polarized laser beam 21 is reflected by a prism 23 through the prism 15 to fall upon the mirror 16 of the X-deflection galvanometer 45 which will deflect the laser beam 21 in the horizontal direction as it enters the relay lens 17. Upon leaving the relay lens 17, the "P" polarized laser beam 21 falls upon the deflecting mirror 25 of the Y-deflection galvanometer 46 which selectively deflects the laser beam 21 in the vertical direction as it enters the focus lens 18. Upon leaving the focus lens 18 the "P" polarized laser beam 21 is direct to the polarizing cube 19.

As will be apparent from the above, the same laser beam deflecting system and virtually the same laser beam optical system is utilized for both the "S" polarized laser beam 12 and the "P" polarized laser beam 21 to provide a system that is both economical and reliable.

Before proceeding further with the description of the laser recording and projection system in accordance with the present invention the optical characteristics of the achromatic polarizing cubes 19 and 39 utilized in this invention will be discussed. White light directed through the polarizing cube will be divided into a first beam of white light that is polarized in the "P" plane and into a second beam of white light that is polarized in the "S" plane. Polarized white light applied to the polarizing cube is either reflected or transmitted therethrough in accordance with the curves illustrated in FIG. 2 wherein the vertical coordinate is set forth in percentage of light transmission and the horizontal coordinate is in nanometers of wavelength of the applied light. In this regard it is noted that the entire visible spectrum is generally found within the wavelengths of 400 to 700 nanometers. The 480 and 514 nanometer wavelength radiation from the argon laser 11 is illustrated graphically by the vertical lines 54 and 55, respectively. The 632.8 nanometer wavelength of radiation from the helium-neon laser 20 is indicated by the vertical line 56. The curve 53 illustrates the percentage of transmission of "S" polarized radiation through the polarizing cube 19 whereas the curve 52 indicates the percentage of transmission of "P" polarized radiation through the polarizing cube. As will be apparent from an inspection of FIG. 3, "S" polarized radiation, such as the radiation 12 from the argon laser 11, will be almost totally reflected by the polarizing cube. On the other hand nearly all of "P" polarized radiation, such as the radiation 21 from the helium-neon laser 20, will be transmitted through the polarizing cube.

The polarizer cubes 19 and 39 utilized in the present invention are commercially available and are manufactured by the Herron Division of the Bausch and Lomb Optical Co. in Long Beach, Calif. Briefly described the polarizing cubes 19 and 39 include two prisms which are joined to form a cube. The mating surface of one of the two prisms is deposited with alternate layers of material having high and low indices of refraction. For example an index of refraction of 1.8 was utilized as a high index whereas an index of refraction of about 1.35 was utilized as a low index. The index of refraction, the thicknesses of deposited layers and the number of layers are carefully choosen to obtain the desired polarization split. The same deposited, polarization layers are utilized between the mating surfaces of the prisms 23 and 15.

The projector portion of the apparatus includes a projection lens 26 having a projection axis 27. In order to efficiently project the light applied thereto an f/3 projection lens 26 was choosen with a 10inch diameter pupil located about 22 inches behind the film 31, or image plane, of the projection lens 26. Located on the side of the polarizing cube 19 opposite from the projection lens 26 is an image recording medium 31. As described in U.S. Pat. No. 3,961,334 the disclosure of which is incorporated herein by reference, the recording medium 31 may comprise 35mm metalized film suitably mounted in sprockets (not shown) so that when desired, previously used film may be withdrawn from a supply spool and stored on a take-up spool. An image is formed in a well known manner on the metallized film 31 by a focused laser bean selectively burning away portions of the metallized coating. The recording film 31 is located substantially perpendicular to the projection axis 27 at the image plane of the projection lens 26. In this regard a glass block 30 located between the polarizing cube 19 and the film 31 enables proper positioning of the film 31. A filter 32 is located on the side of the recording film 31 remote from the glass block 30. The filter 32 can be resiliently biased against the film 31 by any suitable means (not shown) to properly position the film 31 with respect to the image plane of the projection 26. By backlighting the film 31, an image formed therein will be projected along the projection axis 27 through the glass block 30, the polarizing cube 19 and the projection lens 26 and therefrom onto a screen (not shown).

The "S" polarized radiation beam 12 entering the polarizing cube 19 from the focusing lens 18 is reflected by the polarizing cube 19 onto the recording film 31. Accordingly, by selective deflection and blanking of the "S" polarized laser beam 12 any desired image can be formed on the film 31. During normal operation of the laser recording and display system it is contemplated that the metallized film 31 will not be moved until completion of the particular problem or data display. While the film 31 remains stationary, the focused laser beam 12 may be suitably deflected to burn additional symbols or plotting data in the metallized film 31 surface all of which will be simultaneously displayed along with the existing data previously recorded in the same film frame.

The laser beam 21 that is "P" polarized entering the polarizing cube 19 from the focusing lens 18 will be transmitted or passed through the polarizing cube 19. After passing through the polarizing cube 19 the "P" polarized radiation 21 passes through a quarter wavelength retardation plate 29 to become circularly polarized. The circularly polarized radiation beam 21 is reflected by a mirror 28. The reflected and now reverse circularly polarized radiation beam 21 again passes through the quarter wavelength retardation plate which causes the beam 21 of radiation to become polarized in the "S" plane. Upon reentering the polarizing cube 19 the laser radiation beam 21, now polarized in the "S" plane, will be reflected by the polarizing cube 19 along the projection axis 27 through the projection lens 26 onto the viewing screen (not shown). By selectively controlling the deflection of the laser radiation beam 21, the laser beam 21 can be projected onto the screen (not shown) to function as a pointer with regard to the displayed image.

The mirror 28 preferably includes adjusting means (not shown) which enable the mirror 28 to be adjusted in their vertical direction to enable proper focusing of the laser radiation beam 21 at the displayed image. As will be apparent to those skilled in the art, the laser beam 21 may be scanned to provide a desired geometric shape or outline to the pointer produced at the screen (not shown).

As will be apparent from the above, the same projector system is utilized both to record images on the film 31 with the laser beam 12 and to provide a pointer for the projected image by means of the laser beam 21.

Since the polarizing cube 19 can only pass illumination that is polarized in the "P" plane, all of the illumination which backlights the film 31 to project the image thereon is, ideally, also polarized in the "P" plane. In accordance with the present invention, unpolarized illumination radiation is caused to be polarized in the "P" plane before it is utilized to backlight the image bearing film 31. As shown in FIG. 1 a source 33 of randomly polarized white light 51, such as a Xenon lamp, is located adjacent an elliptical reflector 34 which directs the unpolarized radiation 51 through an apertured plate 35. The unpolarized radiation 51 is formed into a slightly converging bundle by means of a condensing lens system including lens 38 and 36. The radiation 51 is reflectd by a mirror 37 through a condensing lens 38. The unpolarized radiation then enters an achromatic polarizing cube 39. In accordance with a preferred embodiment of the present invention the optical characteristics of the polarizing cube 39 are substantially identical to the optical characteristics of the polarizing cube 19. The polarizing cube 39 splits the unpolarized radiation 51 into a first beam 51A that is polarized in the "P" plane and a second beam 51B that is polarized in the "S" plane. The first beam 51A is reflected by a mirror 44 to backlight the film 31. The second beam 51B polarized in the "S" plane is reflected by a mirror 40 through an achromatic one-half wavelength retardation plate 43 that changes the "S" plane polarization into "P" plane polarization. The second beam 51B, now polarized in the "P" plane, is reflected by the mirror 44 to also backlight the film 31. As will non be apparent, efficient use is made of the illumination radiation 51 provided by the unpolarized source 33 by converting the unpolarized radiation into radiation that is polarized in the "P" plane. As is shown by curve 54 in FIG. 2 at least 90% of white light polarized in the "P" plane is passed by the polarizing cube 19 when projecting an image on the film 31.

FIG. 3 illustrates a multi-color filter 32 which has an outline which generally conforms to an image frame on the film 31. The filter includes a vertical rectangular color filter portion 47 at one side thereof and a vertical rectangular color filter portion 48 at the opposite side thereof. At the top and bottom of the filter 32 and between the filter elements 47 and 48 are rectangular color elements 49 and 57, respectively. In accordance with one embodiment of the present invention, the center portion 50 of the filter 32 did not contain a color filter portion so that the portion of the image projected within the area 50 was white whereas the portion of the projected image located within the filter elements 47, 48, 49 and 57 corresponded to the color of the respective color filters 47, 48, 49 and 57. As will be apparent, there are an almost unlimited number of geometric shapes which may be utilized in forming the multi-colored filter 32.

What is claimed is:

1. A recording and projection system comprising;

a projection lens having a projection axis, image recording medium located at the object plane of said projection lens and positioned substantially perpendicular to said projection axis, said recording medium normally having an opaque state that is changed into a transparent state where exposed to focused laser radiation, a polarizer cube located between said recording medium and said projection lens and along said projection axis for reflecting light that is polarized in a first plane and transmitting light that is polarized in a second plane, a first laser providing laser radiation polarized in said first plane, a second laser providing laser radiation polarized in said second plane, means for selectively deflecting said laser radiation from said first and second lasers and directing said deflected radiation into said polarizer cube in a direction substantially perpendicular to said projection axis, said laser radiation polarized in said first plane being deflected by said polarizer cube to said recording medium to record an image therein, said laser radiation polarized in said second plane being transmitted thru said polarizer cube, polarizing and reflecting means interposed in the path of said radiation polarized in said second plane and transmitted through said polarizer cube for causing the polarization of said transmitted laser radiation to be polarized in said first plane and reflecting said transmitted radiation back into said polarizer cube, said radiation polarized in said second plane and reflected back through said polarizer cube being reflected by said polarizer cube to pass through said projection lens along said projection axis, a source of illumination radiation polarized in said second plane located behind said recording medium for projecting said images recorded on said recording medium through said polarizer cube and said projection lens along said projection axis.

2. The recording and projection system according to claim 1 wherein said source of illumination radiation polarized in said second plane includes;

a source of unpolarized radiation, means for focusing and directing said unpolarized radiation into a beam, a polarizer cube interposed in the path of said unpolarized radiation beam for producing a first beam of illumination radiation polarized in said first plane and a second beam of illumination radiation polarized in said second plane, polarization means interposed in the path of said first beam of illumination radiation for causing said first beam to be polarized in said second plane, and, means for directing said first and second beam of illumination radiation polarized in said second plane through said record media for projecting the image recorded thereon along said projection axis through said projection lens and said polarizer cube located between said recording medium and said projection lens.

3. The recording and projection system according to claim 1 wherein;
said polarizing and reflecting means interposed in the path of said radiation polarized in said second plane includes a quarter wavelength retardation plate and a mirror respectively.

4. The recording and projection system according to claim 1 wherein
said polarizer cubes include two optical prisms joined to form a cube.

5. The recording and projection system according to claim 1 further including
a color filter between said illumination radiation and said record medium for altering the color content of said projected images.

6. The recording and projection system according to claim 2 wherein
said polarization means interposed in the path of said first beam of illumination radiation for causing said first beam to be polarized in said second plane includes a one half wavelength achromatic retardation plate.

7. The recording and projection system according to claim 2 wherein
said polarizer cubes have substantially the same optical characteristics.

8. The recording and projection system according to claim 1 wherein
said first laser includes a pulsed argon laser.

9. The recording and projection system according to claim 1 wherein
said second laser includes a continuous wave helium-neon laser.

10. A method of writing and projecting images comprising the steps of;
projecting a first laser beam polarized in a first plane and a second laser beam polarized in a second plane into a polarizer cube wherein said first laser beam is reflected to a record medium to record an image thereon and wherein said second laser beam polarized in said second plane is transmitted through said polarizer cube, changing the polarization of said transmitted second laser beam to cause said transmitted laser beam to become polarized in said first plane, reflecting said transmitted second laser beam now polarized in said first plane back into said polarizer cube wherein said second laser beam is reflected in a direction opposite to that of said first laser beam to enable said second laser beam to function as a pointer, backlighting said record medium with illumination radiation polarized in said second plane to project said recorded images through said polarizer cube, and selectively deflecting said first and second laser beams.

11. The method of writing and projecting images according to claim 10 wherein said illumination radiation polarized in said second plane is obtained by,
focusing a source of unpolarized illumination radiation into a beam, converting said unpolarized illumination beam into a first beam polarized in said first plane and a second beam polarized in said second plane, causing said first beam to become polarized in said second plane, backlighting said record medium with said first and second beams polarized in said second plane.

* * * * *